April 27, 1965    J. SIDLES ETAL    3,180,468
BRAKE OR CLUTCH MECHANISM
Filed July 10, 1963    2 Sheets-Sheet 1

INVENTORS
JAMES SIDLES
BY ALBERT M. JOSEPH
John D. Haney
ATTY.

April 27, 1965   J. SIDLES ETAL   3,180,468
BRAKE OR CLUTCH MECHANISM
Filed July 10, 1963   2 Sheets-Sheet 2
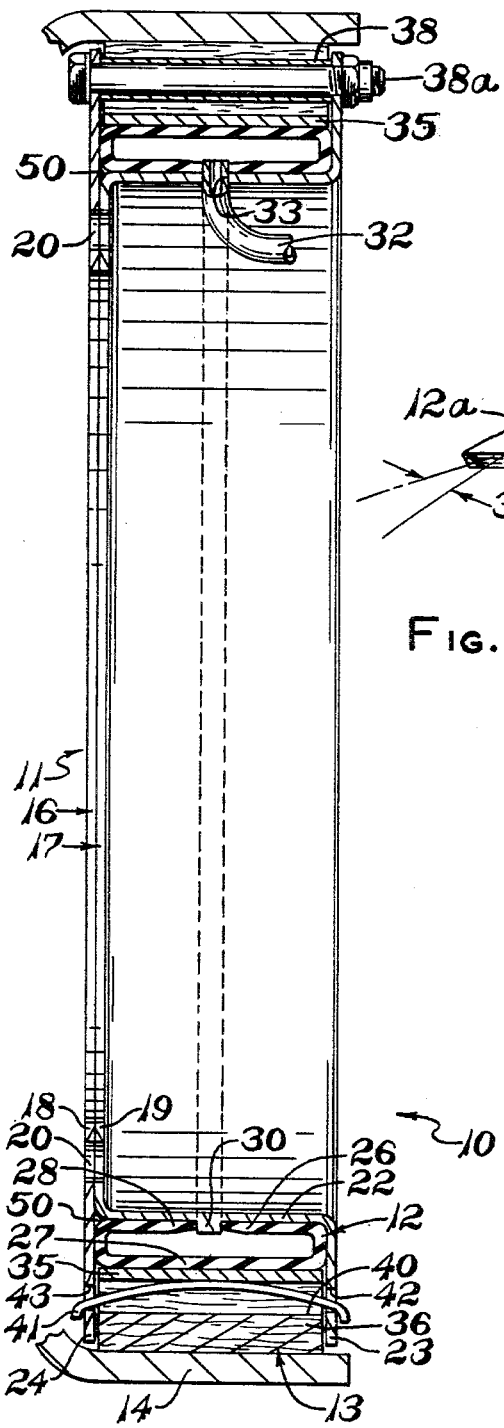
FIG. 2
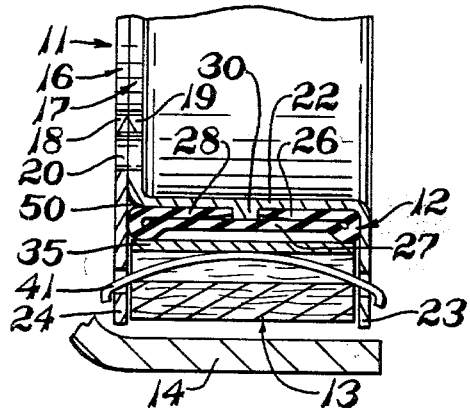
FIG. 4
FIG. 3
INVENTORS
JAMES SIDLES
BY ALBERT M. JOSEPH
John D. Haney
ATTY.

3,180,468
BRAKE OR CLUTCH MECHANISM
James Sidles, Cuyahoga Falls, and Albert M. Joseph, Akron, Ohio, assignors to The B. F. Goodrich Company, New York, N.Y., a corporation of New York
Filed July 10, 1963, Ser. No. 294,113
6 Claims. (Cl. 192—88)

This invention relates to improvments in expander tube brakes. Such brakes (prior to this invention) have been actuated by an endless annular rubber tube of oblong cross-section, commonly called an "expander" tube, which is radially distensible by fluid pressure to press a series of brake shoes against a rotatable braking member such as a brake drum. Inasmuch as the principles of this invention are applicable to mechanisms of this class when used for clutch service, the term "brake" is used herein in a broad sense to include mechanisms for clutching (i.e., for effecting a temporary rotary connection between two rotatable members), as well as for braking (i.e., for retarding or stopping a rotating member).

Expander tubes for these brakes have been ordinarily regarded, prior to this invention, as pressure vessels. That is to say, an expander tube has been made as a fully closed tube except for a small fluid inlet pipe, and has been made of several plies of fabric-reinforced rubber material. Consequently, the interior fluid-exposed surface of these tubes is not accessible for direct molding or for inspection after the tubes are initially shaped. Even with X-ray or other inspection techniques, it has not been possible to judge accurately whether the fluid-exposed inside surface of these closed tubes is of acceptable quality for service in a brake. Tubes with defective interior surfaces tend to fail rapidly in service and have been a source of great difficulty in this class of brakes.

According to this invention, a flexible fluid-distensible actuating member for these brakes is provided which has its fluid-exposed surface accessible for direct molding and inspection, thereby obviating the foregoing problems of the prior art tubes. This new actuation member is in effect an "open-sided" expander tube in that it is built and molded in the shape of a thin wide endless band of elastic fabric-reinforced rubber with free circumferential margins. Both sides of the band are directly molded during the curing operation. The band is made slightly shorter than the periphery of the brake frame in which it is installed so that the band is stretched as it is mounted in the brake shoe channel on the brake frame. In its installed condition, each of the margins of the band is folded under the intramarginal region of the band. The intramarginal region engages the brake shoes in the channel. The inwardly folded margins elastically engage the brake frame to form a fluid pressure seal against the bottom of the brake shoe channel. Actuating fluid is introduced into the region between the inwardly folded margins and the intramarginal region. The force of this pressure is sustained by the brake shoes, the side walls and the bottom of the brake shoe channel, and not by the actuating member itself. The force of the pressure further operates on the inwardly folded margins to reinforce the fluid pressure seal.

In addition to being much easier to manufacture with accuracy and reliability than the prior art tubes, the new actuating member is more durable in service than the prior art closed tubes. Inasmuch as the actuating member is installed in the brake shoe channel in elastic frictional engagement with the channel, and is not positively fastened to the channel at any place around the periphery of the actuator, the actuating member is free to slip circumferentially relative to the brake frame in response to severe braking loads, particularly where the load is applied in rapidly reversing cycles. This relieves the actuating member from the circumferential tearing or shredding action which would otherwise be imposed on it, if the actuating member were positively fastened to the brake frame as in certain prior art proposals.

A brake embodying the preferred form of improved actuating member is shown in the accompanying drawings in which:

FIG. 2 is a cross section of the brake along the line 2—2 of FIG. 1, the view showing the condition of the mechanism when the brake is actuated;

FIG. 3 shows a partial cross section but with the brake in released condition; and FIG. 4 shows an enlarged cross section of the improved actuator of this assembly before it is assembled with the brake parts.

Figure 1:
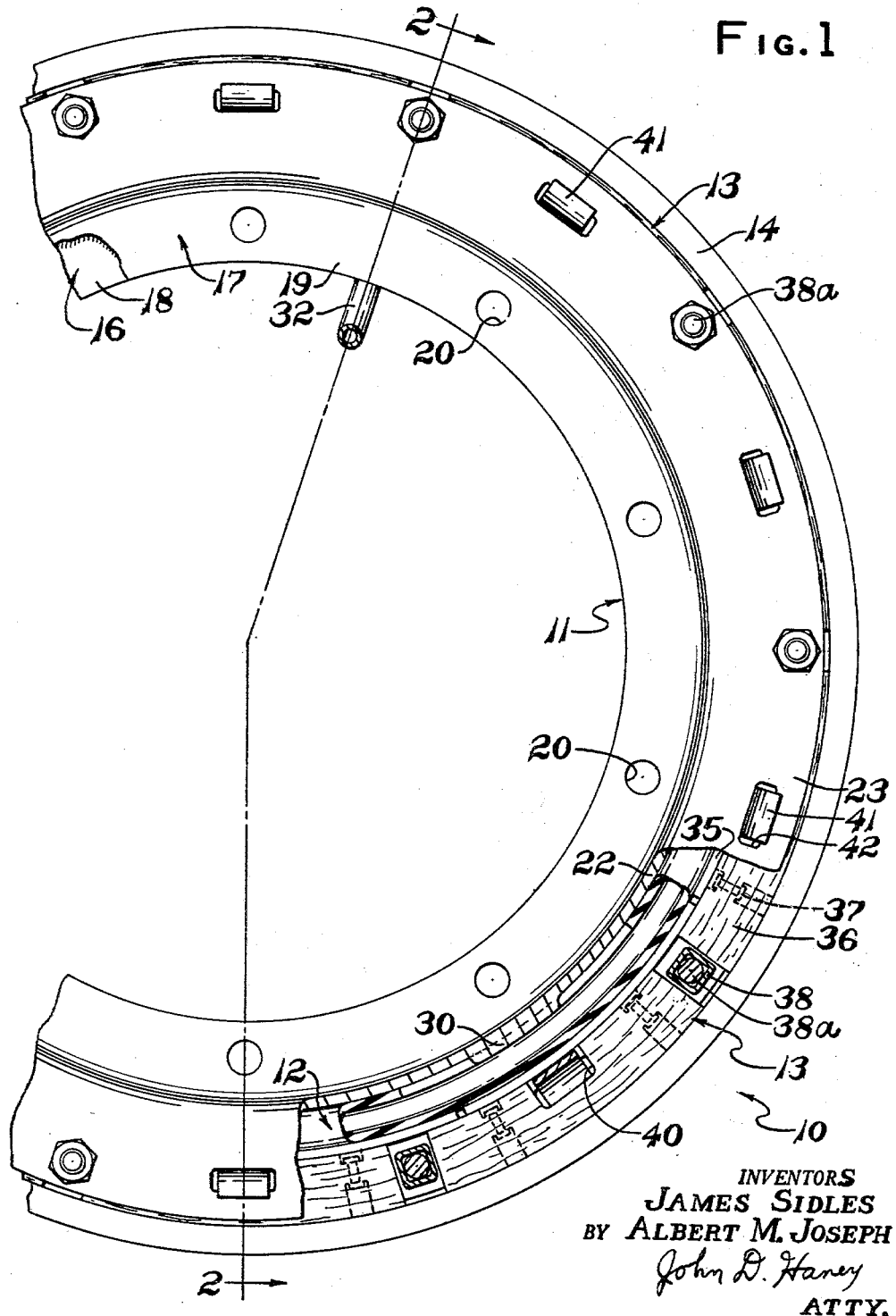
FIG. 1 is a partial side view of the brake mechanism.

The brake assembly 10 (FIG. 1) includes a brake frame 11, a fluid distensible flexible actuating member 12 and a series of friction brake shoes 13. In ordinary braking service, the assembly of the brake frame, actuator and brake shoes is mounted rigidly to a vehicle frame or other structure to provide the non-rotatable braking element. This assembly operates in cooperation with a brake drum 14 which would be mounted for rotation on a rotary part against which the braking action is effected.

The brake frame 11 in the illustrated embodiment consists (see FIG. 2) of a flat annular metal plate 16 which fits axially against an annular metal ring 17 having a generally Z-shaped cross section. Plate 16 and 17 have radially inner portions 18 and 19 which fit flat against each other and through which a series of mounting holes 20 are drilled. Plates 16 and 17 are preferably not fastened integrally to each other, but their respective mounting holes 20 register so that the brake frame may be mounted on a series of studs (not shown) which project through the holes 20. Frame ring 17 has an axially extending portion 22 and a radially extending portion 23 which is parallel to the outer peripheral portion 24 of plate 16. Portions 23 and 24 form the opposing sides of an annular brake shoe channel to receive the annular actuating member 12 and the brake shoes 13. Portion 22 of frame ring 17 forms the bottom portion of this channel.

The actuating member 12 is made in the form of a flat endless flexible ring (see FIG. 4), the circumference of which is slightly shorter than the circumference of the bottom of the brake shoe channel. More particularly the actuating member is shorter than the circumference of the outwardly directed surface of portion 22 of frame ring 17. The axial width of the actuating member 12, before it is assembled in the brake, is approximately twice the lateral width of the channel defined by the parallel plate portions 23 and 24.

FIG. 4 best shows the shape and cross section of the actuating member 12 before it is assembled, the actuating member in FIG. 4 being axially symmetrical about the circumferential center line shown in this view. Preferably the actuating member is made of two plies 12a and 12b of rubber-coated weftless cord fabric. The fabric plies are arranged so that the cords of each ply lie at about a 30° angle with the circumferential center line of the actuating member. However, the cords of the outer ply 12a are transverse to the cords of the inner ply 12b. The ends of the cords terminate short of the edges of the actuating member 12. Alternatively, the actuating member 12 may be made entirely of rubber, the cord reinforced version being required where clearances between inner curved plate 35 and radial portions 23 and 24 would otherwise allow rubber extrusion between these members.

To install the actuating member 12, one of its margins 26 is first stretched circumferentially over the region of portion 22 of frame ring 17 which adjoins radial portion 23. The intramarginal center region 27 of the actuating member 12 is then folded reversely upon the margin 26 so that the intramarginal region 27 extends across the channel. Then the opposite margin 28 is folded inwardly and tucked under the intramarginal region 27 and it is also stretched over the portion 22 of frame member 17 adjoining radial portion 24.

The portion 22 of frame ring 17, forming the bottom of the channel, includes a center circumferential rib 30 against which the edges of margins 26 and 28 are positioned in laterally abutting relation. As shown in FIG. 2, the frame member 17 further includes a nozzle 32 which is rigidly fastened to portion 22 of frame member 17 in a hole 33 which extends through the rib 30. The fluid actuating system (not shown) is adapted for connection to the interior of the actuating member through the nozzle 32 so that the region of the actuating member between the intramarginal portion 27 and the two margins 26 and 28 is communicated to a source of fluid pressure.

Each brake shoe 13 consists of an inner curved plate 35 (FIG. 1) and a curved block of lining material 36 suitable to provide a friction braking surface against the opposing cylindrical surface of brake drum 14. These blocks and plates are connected by rivets 37 (FIG. 1) and are curved to the peripheral curvature of the brake shoe channel. The brake shoes fit into this channel end-to-end between the radial portions 24 and 23 in the manner shown in FIGS. 1–3. The ends of adjoining brake shoes 13 are separated one from another by transverse spacer tubes 38 (see FIGS. 1 and 2) extending between radial portions 23 and 24 and which are held in place by cross bolts 38a.

Midway between its end portions, each brake shoe is transversely slotted at 40. A leaf spring 41 extends through this slot and the ends of the spring project through holes 42, 43 in radial portions 23, 24, respectively. These springs are arranged to bias the brake blocks toward the actuating member 12 at the bottom of the channel and away from the brake drum 14. FIG. 3 shows the condition of the springs when the brake is released and FIG. 2 shows the corresponding condition of the springs when the brake is engaged.

To actuate the brake, a suitable source of fluid pressure (not shown) which is preferably hydraulic oil but could be compressed air or other fluid is communicated to the nozzle 32 and hence into the annular chamber defined between the intramarginal region 27 and the margins 28 and 26 of the actuating member. The pressure expands the actuating member from its released condition approximately as shown in FIG. 3 to its fully energized condition as shown in FIG. 2. Because of the cord construction of the actuating member 12, it is adapted to expand elastically to permit this distension.

No portion of the actuating member 12 is positively connected to the brake frame 11 (i.e., the plate 16 or ring 17). Accordingly, the actuating member 12 is free to shift its position circumferentially in the channel defined by portions 22, 23 and 24 of the brake frame in response to braking loads imposed on the brake shoes 13. Moreover, the elastic character of the actuating member 12 is such that the marginal portions 26 and 28 provide an adequate seal to prevent leakage of the system actuating fluid through the brake frame. Inasmuch as the force of the actuating fluid is actually resisted by the brake frame channel portions and the brake shoes because the fluid forces the actuating member snugly against these pieces, the actuating member 12 serves more like a fluid-impervious liner for the channel than like a pressure vessel. When fully distended, the actuating member is pressed tightly against the adjoining rigid metallic surfaces of the brake frame and the brake shoes as shown in FIG. 2.

In the design shown in the drawings, the brake frame also preferably has a rubber gasket 50 in the crevice between plate 16 and the inner flange 19 of frame ring 16. This gasket prevents the actuating member 12 from being extruded into this crevice.

Inasmuch as the actuating member 12 is made as an endless flat band consisting of plies 12a and 12b, it may be made much more simply than closed tubes by merely winding the plies upon cylindrical drums or drums which are crowned slightly along the center of their periphery. Both sides of the actuator may be molded accurately to insure a good bond between the plies 12a and 12b and to provide molded inner and outer surfaces.

Variations of the construction described may be made within the scope of the appended claims.

We claim:

1. Mechanism for braking or clutching service comprising a rigid frame having an annular channel including a bottom and opposing radial sides; friction shoes in said channel; and a fluid distensible actuating member in said channel for displacing said friction shoes radially of the channel; said actuating member being an annular endless elastic ring having a central intramarginal portion bounded axially by two free circumferential margins, said margins having an unstretched circumferential length which is shorter than the circumference of the bottom of said channel, said actuating member being disposed in said channel so that said intramarginal portion extends transversely of the channel from one side to the other, and each of said free circumferential margins extends transversely of said channel inwardly toward each other from a region thereof contacting opposite sides of the channel between said bottom and said intramarginal portion and each margin fitting snugly against the sides and the bottom of said channel, the entire inwardly extending portion of each margin being circumferentially stretched in radial sealing engagement with the bottom of said channel and the margins being unrestrained for movement lengthwise and transversely of said channel except for the frictional engagement of said margins with said bottom and the regions of said actuating member contacting said sides of the channel; and means for communicating fluid pressure between said intramarginal portion and said margins to distend said intramarginal portion radially of said channel and to urge said margins radially against the bottom of said channel, said channel sides laterally confining said actuating member during such distension.

2. Mechanism as defined in claim 1 wherein the circumferential length of said margins is substantially equal to the circumferential length of said intramarginal wall portion whereby said intramarginal wall portion is in radial engagement with said margins prior to the communication of pressure to said actuating member.

3. Mechanism as defined in claim 1 wherein said actuating member is of substantially uniform thickness throughout its length and width.

4. Mechanism as defined in claim 1 wherein said rigid frame has a narrow medial rib extending circumferentially around the bottom of the channel against which the edges of said margins are aligned, and a passage through said rib for communicating fluid pressure into the region of the channel between said intramarginal portion and said margins.

5. Mechanism as defined in claim 1 wherein said actuating member is made of plies of rubber covered weftless cord fabric, the cords of each ply making an angle with the circumferential center line of said actuating member at about 30°, the cords of one ply being disposed transversely to the cords of the next adjacent ply.

6. Mechanism for braking or clutching service comprising a rigid frame having an annular channel including a bottom and opposing sides; friction shoes in said channel; and a fluid distensible actuating member in said channel for displacing said friction shoes in the channel; said actuating member being an annular endless flexible ring having a central intramarginal portion bounded axially by two free circumferential margins, said actuating member being disposed in said channel so that said intramarginal portion extends transversely of the channel from one side to the other, and each of said free circumferential margins extends transversely of said channel inwardly toward each other from a region thereof contacting opposite sides of the channel between said bottom and said intramarginal portion and each margin fitting snugly against the sides and the bottom of said channel, the margins of the actuating member being unrestrained for movement lengthwise and transversely of said channel except for the frictional engagement of said margins with said bottom and the regions of said actuating member contacting said sides of the channel, and means for communicating fluid pressure between said intramarginal portion and said margins to distend said intramarginal portion against said friction shoes and urge said margins against the bottom of said channel, said channel sides laterally confining said actuating member during such distension.

References Cited by the Examiner
UNITED STATES PATENTS

| | | | |
|---|---|---|---|
| 2,570,345 | 10/51 | Hollerith | 188—152 |
| 2,637,345 | 5/53 | Kraft | 188—152 X |
| 2,710,087 | 6/55 | Picard | 188—152 X |
| 2,786,507 | 3/57 | Howe et al. | 152—356 X |
| 2,940,572 | 6/60 | Warman | 188—152 X |

ARTHUR L. LA POINT, *Primary Examiner.*

EUGENE G. BOTZ, *Examiner.*